United States Patent [19]

Uehara

[11] Patent Number: 4,756,380
[45] Date of Patent: Jul. 12, 1988

[54] COOLING SYSTEM FOR A REAR CUSHION UNIT

[75] Inventor: Kenji Uehara, Tokyo, Japan

[73] Assignee: Honda Giken Kogyo Kabushiki Kaisha, Tokyo, Japan

[21] Appl. No.: 65,981

[22] Filed: Jun. 23, 1987

[30] Foreign Application Priority Data

Jun. 23, 1986 [JP] Japan .................................. 61-95751

[51] Int. Cl.⁴ ............................................. B62K 25/20
[52] U.S. Cl. ..................................... 180/227; 280/284
[58] Field of Search ........................ 180/227, 219, 230; 280/284; 188/274, 264 D; 55/385 B

[56] References Cited

U.S. PATENT DOCUMENTS 4,412,596 11/1983 Pudil et al. ........................... 180/227
4,616,810 10/1986 Richardson et al. ............ 180/227 X Primary Examiner—John A. Pekar
Attorney, Agent, or Firm—Lyon & Lyon

[57] ABSTRACT

A rear cushion unit having an oil storage chamber integrally arranged therewith at the upper rearward side thereof on a motorcycle. An air cleaner is arranged behind the chamber with an intake passage at the upper portion thereof. Spacing is provided around the chamber and the air intake passage such that air flow may be drawn around the chamber by the intake passage when the engine is running. In this way, cooling of the chamber is accomplished.

3 Claims, 2 Drawing Sheets

COOLING SYSTEM FOR A REAR CUSHION UNIT

BACKGROUND OF THE INVENTION

The field of the present invention is cushioning mechanisms for vehicles and, more particularly, cooling systems for such cushioning mechanisms.

Cushion units for motorcycles have long been employed which include a damping unit and a spring operatively coupled between the frame of the motorcycle and a rear swing arm. Recent designs have also incorporated the central placement of a single such cushion unit on the motorcycle with the unit including a hydraulic damping system. With such arrangements, it is possible that the hydraulic fluid may be heated enough through use so that the performance of the cushion unit changes.

A motorcycle is illustrated in FIG. 5 with a known suspension system. Located rearwardly of an engine 31 and substantially in the center of the vehicle is a rear cushion unit 32. This rear cushion unit 32 includes an oil storage chamber 33 which is separately provided from a cushion actuating chamber 34. The oil storage chamber 33 and the actuating chamber 34 are connected by a hydraulic line. The cushion unit 32 is positioned forwardly of an air cleaner 35 and below a seat 36. The oil storage chamber 33 is shown affixed to a frame member 37 such that the oil contained therein is cooled by the chamber being located in the air stream when the vehicle is moving.

The foregoing arrangement can provide adequate cooling but requires multiple separate elements, a hydraulic line and additional brackets for mounting the multiple elements. Further, cooling relies on forward movement of the motorcycle and no air is induced past the storage chamber 43 with the motorcycle stopped.

SUMMARY OF THE INVENTION

The present invention is directed to a cooling system for a rear cushion unit with an oil storage unit integrally arranged. Arrangement of the unit is such that air to an air cleaner is drawn past the oil storage chamber for cooling, even when the vehicle is stopped with the engine running.

Accordingly, it is an object of the present invention to provide an improved rear cushioning system. Other and further objects and advantages will appear hereinafter.

DETAILED DESCRIPTION OF THE PREFERRED EMBODIMENT

Figure 1:
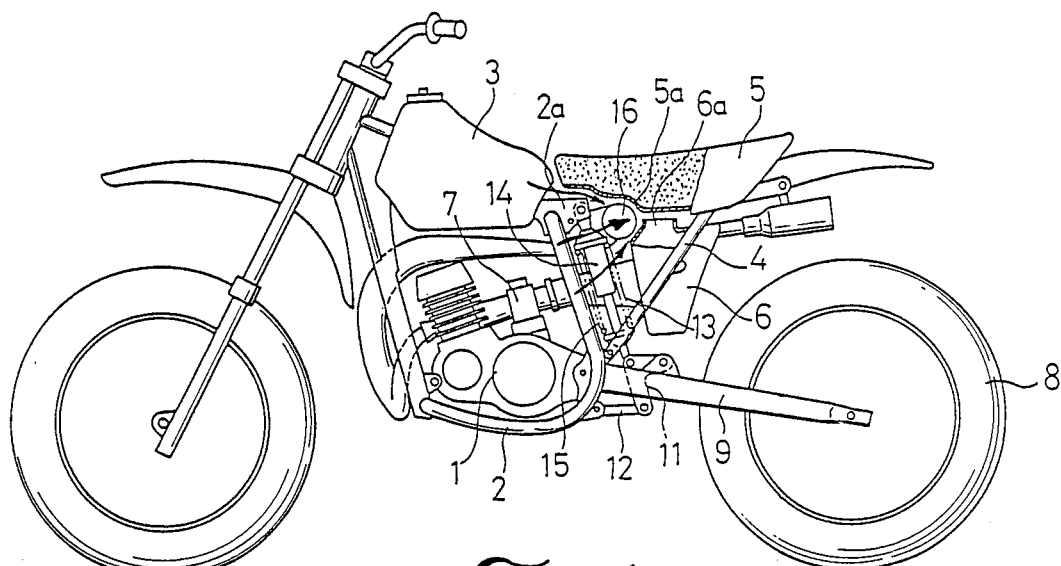
FIG. 1 is a side elevation of a motorcycle employing the present invention.

Turning in detail to the drawings, an engine 1 is carried on the frame 2 of a motorcycle. The motorcycle is shown to include a fuel tank 3 which straddles the main pipe of the frame 2. The main pipe of the frame 2 extends rearwardly beneath the fuel tank 3 to a frame bracket 2a. A rear frame assembly 4 is associated with the main frame 2. The rear frame assembly 4 supports a seat 5 which extends rearwardly of and higher than the engine 1. An air cleaner 6 is also mounted to the rear frame 4 and is connected to the engine 1 through a carburetor 7. A rear wheel 8 is supported by a rear swing arm 9 which, in turn, is pivoted at a lower portion of the main frame 2. Linked between the main frame 2 and the swing arm 9 is a bell crank 11 and a link 12. A cushion unit 13 extends between the bracket 2a of the frame 2 and the bell crank 11.

The rear cushion unit 13 includes a hydraulic cushion actuating chamber 14 and a coil spring 15 positioned concentrically thereabout. The upper end of the rear cushion 13 is pivotally mounted on the upper center bracket 2a of the main frame so that the rear cushion unit 13 is positioned rearwardly of the main frame 2 and in front of the air cleaner 6. The rear cushion unit 13 is centrally located in the vehicle relative to the longitudinal centerline.

On the rear upper portion of the rear cushion unit 13 there is provided an oil storage chamber 16 which is integrally arranged therewith. The storage chamber 16 is in direct communication with the actuating chamber 14. The storage chamber is generally circular in cross section with an axis lying in a plane normal to the axis of the actuating chamber 14. With this arrangement, separate attachment of the cushion components and separate elements for communicating therebetween are avoided.

Figure 2:
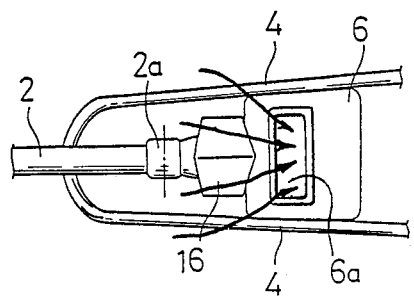
FIG. 2 is a cross-sectional plan view of the cushion unit and air cleaner of FIG. 1.
Figure 5:
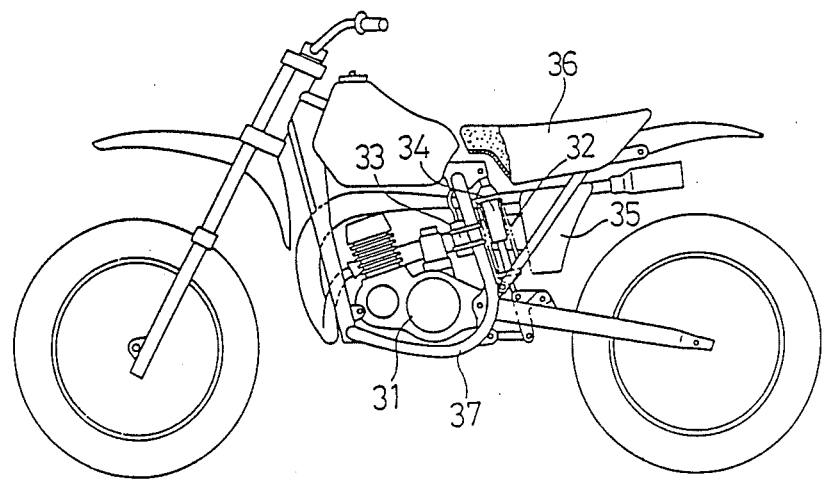
FIG. 5 is a prior art arrangement shown in side elevation.
Figure 3:
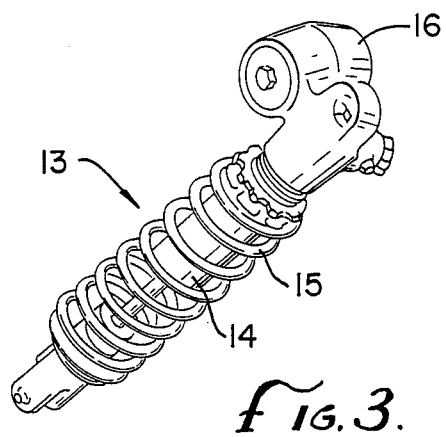
FIG. 3 is a detailed oblique view of the cushion unit of the system of FIG. 1.
Figure 4:
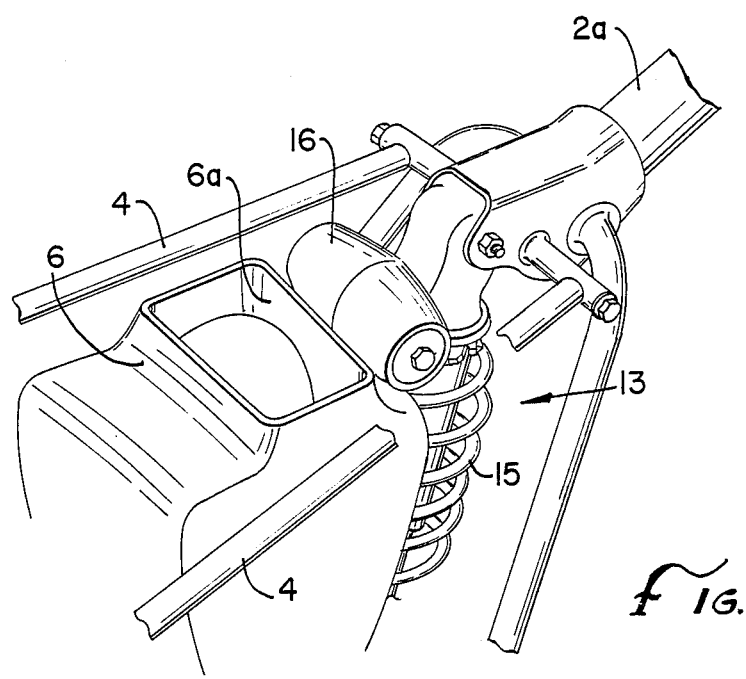
FIG. 4 is a detailed oblique view looking forwarding on the right side of the vehicle toward the air cleaner and cushion unit of the embodiment of FIG. 1.

Clearances are provided between the oil storage chamber 16 and a bottom plate 5a of the seat 5 and between the oil storage chamber 16 and the front upper portion of the air cleaner 6. This is provided to allow air flow about the storage chamber 16 as indicated by the arrows in FIGS. 1 and 2. Further, on the upper portion of the air cleaner 6 there is provided an air intake port 6a which is rearward of the oil storage chamber 16. Clearance also exists between the air intake port 6a and the bottom plate 5a of the seat 5 so that air may flow past the storage chamber 16 and to the intake port 6a.

The arrangement thus provided contributes to the cooling of the cushion system, reduces the number of components and the corresponding weight associated with prior such systems. Further, the system operatively cools whenever the engine is running. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A cooling system for a rear cushion unit on a motorcycle having an engine and a seat mounted to a frame, the seat extending rearwardly of the engine, comprising a cushion member rearwardly of the engine on the motorcycle and including an oil storage chamber integral therewith at an upper portion thereof, said chamber being spaced from and below the seat; and an air cleaner below the seat and spaced from said cushion member on the motorcycle and including an intake on the upper portion thereof rearwardly of said chamber to draw air past said chamber.

2. The cooling system of claim 1 wherein said chamber is on the back portion of said cushion member.

3. The cooling system of claim 1 wherein said cushion member is positioned along substantially the longitudinal centerline of the motorcycle.

* * * * *